United States Patent [19]

Itoh et al.

[11] 3,992,355

[45] Nov. 16, 1976

[54] HEAT-CURABLE ORGANOPOLYSILOXANE COMPOSITIONS

[75] Inventors: Kunio Itoh; Takeo Yoshida; Hironao Fujiki, all of Annaka, Japan

[73] Assignee: Shinetsu Chemical Company, Tokyo, Japan

[22] Filed: Jan. 21, 1975

[21] Appl. No.: 542,823

[30] Foreign Application Priority Data

Jan. 25, 1974  Japan.............................. 49-10669

[52] U.S. Cl...................... 260/46.5 UA; 252/431 P; 252/466 PT; 260/46.5 H; 260/825
[51] Int. Cl.²......................................... C08F 11/04
[58] Field of Search............... 106/287; 260/375 B, 260/46.5 H, 46.5 UA, 825; 252/466 PT, 431 N

[56] References Cited
UNITED STATES PATENTS

| | | | |
|---|---|---|---|
| 3,730,909 | 5/1973 | Armstrong.................... | 252/466 PT |
| 3,814,723 | 6/1974 | Yokokawa et al.................. | 260/825 |
| 3,867,343 | 2/1975 | Garden........................ | 260/46.5 UA |
| 3,876,605 | 4/1975 | Itoh et al....................... | 260/375 B |
| 3,892,707 | 7/1975 | Itoh et al....................... | 260/375 B |

FOREIGN PATENTS OR APPLICATIONS 1,325,818   8/1973   United Kingdom

*Primary Examiner*—Theodore Morris
*Attorney, Agent, or Firm*—Toren, McGeady and Stanger

[57] ABSTRACT

Heat-curable organopolysiloxane compositions comprising a diorganopolysiloxane having at least two vinyl groups per molecule and a viscosity exceeding 100 centistokes at 25° C, an inorganic filler, an organohydrogenpolysiloxane containing at least two Si—H linkages per molecule, a platinum catalyst, a hydrazine compound and optionally, an organic peroxide, which have an improved storage stability and allow for imparting an excellent flame retardancy and mechanical strength to the cured material.

11 Claims, No Drawings

HEAT-CURABLE ORGANOPOLYSILOXANE COMPOSITIONS

FIELD OF THE INVENTION

This invention relates to heat-curable organopolysiloxane compositions. More particularly, the invention relates to heat-curable organopolysiloxane compositions improved in shelf life or storage stability.

DESCRIPTION OF THE PRIOR ART

Heat-curable organopolysiloxane compositions of the addition reaction type comprising a vinyl-group-containing organopolysiloxane, an organohydrogenpolysiloxane, a filler, and a platinum catalyst are well known and, since they usually tend to gradually cure during long storage at room temperature, commercially available as formulations of the so-called two-package system wherein the component in one package is mixed with the other just prior to use. It is also known that the room-temperature curing on storage of the conventional organopolysiloxane compositions can be prevented by use of an additive, such as tin compounds, phosphorus compounds, or acetylenically unsaturated hydrocarbon group-containing organic compounds, whereby the troublesome mixing of the two packages prior to use can be dispensed with. However, the use of these additives works disadvantageously to reduce the flame retardancy of the resultant elastomers.

OBJECT OF THE INVENTION

It is an object of this invention to introduce novel heat-curable organopolysiloxane compositions having improved storage stability and allowing for imparting an excellent flame retardancy to silicone elastomers made therefrom.

It is a further object of the invention to provide a process of preparing such compositions.

DETAILED DESCRIPTION OF THE INVENTION

The heat-curable organopolysiloxane composition introduced by the invention comprises (1) 100 parts by weight of a diorganopolysiloxane having the average formula $$R_a SiO_{4-a/2} \tag{I}$$

where R is a substituted or unsubstituted monovalent hydrocarbon group and a has an average value of from 1.98 to 2.01, which contains at least two vinyl groups per molecule and the viscosity of which exceeds 100 centistokes at 25° C, (2) from 10 to 200 parts by weight of an inorganic filler, (3) an organohydrogenpolysiloxane containing at least two Si—H linkages per molecule in an amount sufficient for giving the Si—H linkages from 0.5 to 15 times in number compared to the vinyl groups contained in component (1) above, (4) platinum or a platinum-containing compound in a catalytic amount, (5) a hydrazine compound having the general formula

(II)

where $R^1$, $R^2$, $R^3$ and $R^4$ each represent a hydrogen atom, phenyl group or alkyl group, provided always at least one of them is a phenyl or alkyl group, in an amount larger than 10% by weight of the amount of component (4) as platinum, and optionally (6) an organic peroxide in an amount of from about 0.01 to 5 parts by weight.

This invention is based, in part, on the discovery that a mixture of a diorganopolysiloxane having two or more vinyl groups per molecule as the main component with an organohydrogenpolysiloxane, an inorganic filler, a platinum catalyst, and a hydrazine compound is remarkedly excellent in long storage stability at room temperature and further that elastomer products produced by curing the mixture possess excellent flame retardant properties.

The diorganopolysiloxane useful as component (1) in the compositions of this invention is represented by formula I in which the monovalent hydrocarbon groups denoted by R are, illustratively, alkyl groups (for example, methyl, ethyl and propyl), halogen-substituted alkyl groups, alkenyl groups (for example, vinyl and allyl), aralkyl groups (for example benzyl), aryl groups (for example, phenyl), and halogen-substituted aryl groups; and the value of a is from 1.98 to 2.01. Further, this component (1) is required to have a viscosity exceeding 100 centistokes at 25° C, preferably exceeding 1,000 centistokes at 25° C, and contain at least two vinyl groups per molecule.

Illustrative of the diorganopolysiloxanes of the above nature are those which are terminated with the dimethylvinylsilyl, trimethylsilyl or dimethylhydroxysilyl groups and which contain methyl and other hydrocarbon groups including vinyl groups as organic groups on their main chains.

The inorganic fillers as component (2) in the composition of the invention serve to impart mechanical strengths to the finished elastomers.

The inorganic fillers are usually powdery silicious oxides, such as fume silica, precipitated silica, quartz flour and diatomaceous earth. In practice, 10 to 200 parts by weight calculated on 100 parts by weight of component (1) are used.

The organohydrogenpolysiloxanes useful as component (3) incorporated in the compositions of the invention are, necessarily, those containing at least two Si-H linkages per molecule. They can be prepared by known processes, and exemplified by methylhydrogenpolysiloxanes terminated with trimethylsilyl groups and varied in polymerization degrees, tetramethyltetrahydrogencyclotetrasiloxane, siloxane copolymers consisting of units $SiO_2$ and $(CH_3)_2Si(H)O_{0.5}$, and copolymers of methylhydrogensiloxane units and diorganosiloxane units.

The organohydrogenpolysiloxanes are necessarily incorporated in amounts such that the Si-H linkages can be given in a number from 0.5 to 15 times the whole number of the vinyl groups contained in component (1).

The platinum or platinum-containing compounds of component (4) are useful as the curing catalyst and for imparting flame retardancy to the resultant silicone elastomers. Illustrative of this component (4) are platinum black, chloroplatinic acid and complexes of chloroplatinic acid with ethylene or propylene. A further example is a complex formed from chloroplatinic acid with alcohols and the like as described in U.S. Pat. No. 3,220,972.

The above-mentioned platinum or platinum-containing compounds can be used usually in a catalytic amount, for example, from 0.1 to 500 p.p.m. by weight, preferably from 2 to 20 p.p.m. by weight, as platinum based on the weight of component (1).

The hydrazine compound as component (5) represented by formula II is an essential ingredient for imparting an excellent storage stability to the composition of this invention. The groups represented by $R^1$, $R^2$, $R^3$, and $R^4$ are hydrogen atoms, alkyl groups, such as methyl, ethyl, propyl, butyl and octyl, and phenyl groups. Illustrative of the hydrazine compounds are monoalkylhydrazines, such as methylhydrazine, ethylhydrazine and octylhydrazine, phenylhydrazine, $\alpha$-methylphenylhydrazine, $\beta$-methylphenylhydrazine, $\alpha$-dimethylhydrazine, and $\beta$-dimethyhydrazine.

The hydrazine compounds must be used in an amount larger than 10% by weight of the weight of component (4) as platinum. If the amount is less than 10% of the weight of component (4) as platinum, the storage stability of the resultant compositions will become insufficient and, on the other hand, if it is too large, for example, more than 150 times the weight of component (4), no satisfactory curing will be achieved on the compositions.

The organic peroxides as component (6) mentioned above serve to further accelerate the curing reaction in the compositions of the present invention. Their examples are commercially available benzoyl peroxide, tertiary butyl peroxide, dichlorobenzoyl peroxide, dicumyl peroxide, tertiary butyl perbenzoate and bis-2,4-dichlorobenzoyl peroxide.

These organic peroxides are optionally incorporated in an amount of from about 0.01 part to as high as 5 parts by weight based on 100 parts by weight of component (1).

In the preparation of the compositions of this invention, all components can be mixed in any desired succession by means of a roller mill, a kneader or a Banbury mixer. It is preferred, however, that the platinum catalyst is incorporated after the other components have been blended uniformly.

As a more preferable embodiment of this invention, the platinum catalyst and the hydrazine compound are first reacted with each other, and the reaction product, which is presumably a salt, is then incorporated into the composition. By this technique, the amount of the hydrazine compound used can be greatly reduced.

The compositions of the invention may also contain a dispersing agent or a wetter, such as, alkoxy-containing polysiloxanes with a low molecular weight, alkoxy-containing silanes and silanolic hydroxy-containing silanes; metal oxides, such as iron oxide, titanium dioxide, and ceric oxide, which work to improve thermal stability as well as flame retardancy and also serve as pigments; and any other additives insofar as the objects of the invention should not be impaired thereby.

The heat-curable organopolysiloxanes of the present invention have a very excellent storage stability at room temperature, and the cured elastomers can have good flame retardancy and mechanical strengths as well. In this respect, the best field of their utility is for electric insulating materials.

The following examples illustrate the present invention. In the examples, parts and percentages are all by weight and the symbol Me denotes a methyl group. Further, the hardness, elongation, tensile strength and tear strength mentioned in the examples were tested and determined in accordance with Japanese Industrial Standard (JIS) C2123. Furthermore in the examples, the "Extinguishing Time" to represent flame retardancy was measured by holding a strip of the elastomer formed, 2 mm thick, 0.5cm wide and 15 cm long, in a substantially vertical direction above a gas burner top in a flame for 10 seconds after which the burner was moved away and the extinguishing time in seconds was recorded.

EXAMPLE 1

To 100 parts of dimethylvinylsilyl-terminated methylvinylpolysiloxane gum with the total vinyl group content of 0.1 mole % were added 22 parts of fume silica having a specific surface area of 200 m$^2$/g, 2.2 parts of a dimethylhydroxysilyl-terminated dimethylpolysiloxane fluid having a viscosity of 20 centistokes at 25° C, and 2 parts of diphenylsilanediol were mixed together on a two-roller mill. The resulting mixture was heated at 160° C for 2 hours, to produce a base compound. To 100 parts of the base compound were added 50 parts of quartz flour having an average particle diameter of 5 $\mu$m, 5 parts of red iron oxide, 1 part of a polysiloxane represented by the formula

a hydrazine compound in varied amounts as indicated in Table I to follow, and 0.1 part of a solution of 2% chloroplatinic acid in 2-ethylhexanol.

The thus prepared formulations as the test samples were tested to determine their shelf life in terms of curing time under varied temperatures. The test results are set out in Table I.

TABLE I

| | Test Sample No. | | | | | | | |
|---|---|---|---|---|---|---|---|---|
| | 1 | 2 | 3 | 4 | 5 | 6 | 7 | 8 |
| Kind of Hydrazine compound used and its amount, part | Methyl hydrazine 0.05 | Same 0.10 | Same 0.15 | Phenyl-hydrazine 0.10 | Same 0.15 | Same 0.30 | Octyl-hydrazine 0.15 | $\beta$-Methyl-phenyl-hydrazine 0.20 |
| Shelf life: | | | | | | | | |
| At 40° C | 15 d. | Over 1 mon. | Over 6 mon. | 7 d. | Over 1 mon. | Over 1 mon. | Over 1 mon. | Over 1 mon. |
| At 70° C | 18 h. | Over 1 mon. | Over 6 mon. | 60 min. | Over 1 mon. | Over 1 mon. | Over 1 mon. | Over 1 mon. |
| At 105° C | 20 min. | 90 min. | 90 min. | 12 min. | 60 min. | 90 min. | 100 min. | 120 min. |

TABLE I-continued

| | Test Sample No. | | | | | | | |
|---|---|---|---|---|---|---|---|---|
| Kind of Hydrazine compound used and its amount, part | 1 Methyl hydrazine 0.05 | 2 Same 0.10 | 3 Same 0.15 | 4 Phenyl-hydrazine 0.10 | 5 Same 0.15 | 6 Same 0.30 | 7 Octyl-hydrazine 0.15 | 8 β-Methyl-phenyl-hydrazine 0.20 |
| At 150° C | 8 min. | 12 min. | 25 min. | 5 min. | 13 min. | 20 min. | 15 min. | 17 min. |

Note: The designation d. is for days; mon. is for month; h. is for hours; and min. is for minutes.

EXAMPLE 2

Test sample No. 2 and No. 5 of Example 1 were subjected to the primary press-curing at 170° C for 10 minutes, followed by a secondary curing at 150° C for 2 hours. These cured samples were then subjected to tests of hardness, elongation, tensile strength and extinguishing time. The results are set out in Table II.

A control sample in which the ingredients were the same as in Example 1 excepting that methylhydrogenpolysiloxane and the hydrazine compound were excluded and that 0.8 part of a silicone paste containing 50% benzoyl peroxide was included was subjected to a similar press-curing at 120° C for 10 minutes. The test results on this control sample as shown also in Table II.

TABLE II

| | Sample No. 2 | Sample No. 5 | Control Sample |
|---|---|---|---|
| Primary press-curing: | | | |
| Hardness | 47 | 46 | 48 |
| Elongation, % | 480 | 460 | 380 |
| Tensile strength kg/cm² | 67 | 66 | 67 |
| Secondary curing: | | | |
| Hardness | 50 | 52 | 52 |
| Elongation, % | 340 | 310 | 300 |
| Tensile strength, kg/cm² | 72 | 78 | 75 |
| Extinguishing Time, Sec. | 7 – 15 | 6 – 11 | 20 – 30 |

EXAMPLE 3

To 100 parts of trimethylsilyl-terminated methylvinylpolysiloxane gum with the total vinyl group content 0.15 mole % were added 100 parts of quartz flour having an average particle diameter of 0.8 μm and 2 parts of titanium dioxide, to be mixed together on a two-roller mill. Then, to 100 parts of the resulting mixture were added 0.1 part of a solution of 2 % chloroplantinic acid in 2-ethylhexanol, 0.1 part of phenylhydrazine and also a methylhydrogenpolysiloxane represented by the formula

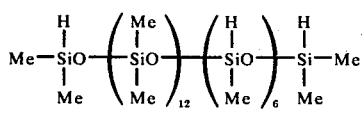

in varied amounts as indicated in the following Table III. The thus prepared formulations as the test samples No. 7 and No. 8 were allowed to stand at 25° C, and it was found that even after the lapse of 2 months, the composition remained unchanged.

These samples were subjected to the curing processes and tests of hardness etc. as in Example 2. The test results are shown in Table III.

TABLE III

| | Sample No. 7 | Sample No. 8 |
|---|---|---|
| Amount of methylhydrogenpolysiloxane, parts | 1.5 | 3.0 |
| Primary press-curing: | | |
| Hardness | 44 | 42 |
| Elongation, % | 235 | 280 |
| Tensile strength, kg/cm² | 47 | 45 |
| Secondary curing: | | |
| Hardness | 45 | 45 |
| Elongation, % | 205 | 210 |
| Tensile strength, kg/cm² | 58 | 55 |
| Extinguishing Time, Sec. | 3 – 10 | 3 – 10 |

EXAMPLE 4

To 100 parts of dimethlvinylsilyl-terminated methylvinylpolysiloxane gum with the total vinyl group content 0.2 mole % were added 2.5 parts of diphenylsilanediol, 6 parts of dimethylhydroxysilyl-terminated dimethylpolysiloxane having a viscosity of 20 centistokes at 25° C and 40 parts of fume silica having a specific surface area of 200m²/g, all the materials to be blended evenly by means of a kneader, followed by heating at 160° C for 2 hours. To 100 parts of the resulting mixture were added 20 parts of quartz flour having an average particle diameter of 5 μm, 0.7 part of a methylhydrogenpolysiloxane represented by the formula

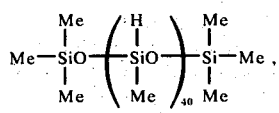

0.1 part of methylhydrazine and 0.06 part of a solution of 2% chloroplatinic acid in 2-ethyhexanol. The mixture was allowed to stand at 25° C for a period of 2 months and thereafter kneaded on a two-roller mill. No change was observed on the remilled material, thus ascertaining the excellency of its storage stability.

The material was then formed into a sheet 2 mm thick. The sheet was subjected to heat-curing at 300° C under atmospheric pressure for 2 minutes, followed by a secondary curing at 150° C for 2 hours. This product showed the physical properties as set out in Table IV.

TABLE IV

| Hardness | 60 |
|---|---|
| Elongation, % | 340 |
| Tensile strength, kg/cm² | 95 |
| Tear Strength, kg/cm | 20 |
| Extinguishing time, sec | 15 – 20 |

EXAMPLE 5

To 100 parts of dimethyvinylsilyl-terminated methyvinylpolysiloxane gum with the total vinyl group content 0.2 mole % were added 2.5 parts of diphenylsilanediol, 6 parts of dimethylhydroxysilyl-terminated dimethylpolysiloxane having a viscosity of 20 centistokes at 20° C and 40 parts of fume silica with a specific surface area of 200 m²/g, all the materials being blended uniformly by means of a kneader, followed by heating at 160° C for 2 hours.

To 100 parts of the resulting mixture were added 20 parts of quartz flour having an average particle diameter of 5 μm, 1.5 parts of a methylhydrogenpolysiloxane represenyed by the formula

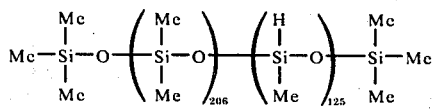

and 0.01 part of a reaction product of 1 mole of choloroplatinic acid and 6 moles of phenylhydrazine prepared by reacting them at room temperature.

The resulting product was allowed to stand at 25° C for a period of 2 months and thereupon kneaded on a two-roller mill. No change was observed on the re-milled material, thus ascertaining the excellency of its storage stability.

The material was then formed into a sheet 2 mm thick. The sheet was subjected to heat-curing at 300° C under atmospheric pressure for 2 hours. The sheet thus treated showed the physical properties as set out in Table V.

TABLE V

| | |
|---|---|
| Hardness | 55 |
| Elongation, % | 450 |
| Tensile strength, kg/cm² | 85 |
| Tear strength kg/cm | 23 |
| Extinguishing time, sec. | 18 – 25 |

EXAMPLE 6

To each of the test samples No. 2 and No. 3 obtained in Example 1 was added 1.2 parts of a silicone paste containing 50 % benzol peroxide, and the mixtures were press-cured at 120° C for 8 minutes, to obtain primary silicone elastomers. These silicone elastomers were further subjected to a secondary curing at 150° C for 2 hours, to obtain secondary silicone elastomers. These primary and secondary products were tested for hardness, elongation, tensile strength and flame extinguishment. The test results are set out in Table VI.

TABLE VI

| | Sample No. 2 | Sample No. 3 |
|---|---|---|
| Primary Products: | | |
| Hardness | 48 | 48 |
| Elongation, % | 420 | 450 |
| Tensile strength kg/cm² | 65 | 67 |
| Secondary Products: | | |
| Hardness | 51 | 51 |
| Elongation, % | 355 | 360 |
| Tensile strength, kg/cm² | 75 | 72 |
| Extinguishing time, sec. | 6 – 17 | 3 – 8 |

EXAMPLE 7

To 100 parts of a dimethlvinylsilyl-terminated methylvinylpolysiloxane having a viscosity of 1,000 centistokes at 25° C were added 100 parts of quartz flour having an average particle diameter of 5 μm, 5 parts of the same methylhydrogenpolysiloxane as used in Example 5, 10 parts of red iron oxide, 0.1 part of methylhydrazine, and 0.1 part of a solution of 2 % chloroplatinic acid in 2-ethylhexanol. The mixture was kneaded by means of a three-roller mill, and the resulting material was allowed to stand at 40° C for 1 month. No change was then observed in the material.

This material was then applied to a metal mold to form a sheet at 120° C for 1 hour. The sheet thus produced showed the physical properties as set out in Table VII.

TABLE VII

| | |
|---|---|
| Hardness | 55 |
| Elongation, % | 120 |
| Tensile strength, kg/cm² | 35 |
| Extinguishing time, sec. | 20 – 25 |

What is claimed is:

1. A heat-curable organopolysiloxane composition comprising (1) 100 parts by weight of a diorganopolysiloxane having the average formula $$R_n SiO_{4-n/2}$$

where R is a substituted or unsubstituted monovalent hydrocarbon group selected from the group consisting of alkyl, halogen substituted alkyl, halogen-substituted alkyl groups, alkenyl groups, aralkyl groups, aryl, and halogen substituted aryl, and has an average value of from 1.98 to 2.01, which contains at least two vinyl groups per molecule and the viscosity of which exceeds 100 centistokes at 25° C, (2) from 10 to 200 parts by weight of an inorganic filler, (3) an organohydrogenpolysiloxane containing at least two Si-H linkages per molecule in an amount sufficient for giving the Si-H linkages from 0.5 to 15 times in number compared to the vinyl groups contained in component (1) above, (4) platinum or a platinum-containing compound in a catalytic amount, and (5) a hydrazine compound having the general formula

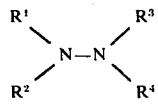

where $R^1$, $R^2$, $R^3$ and $R^4$ each represent a hydrogen atom, a phenyl group or an alkyl group having from 1 to 8 carbon atoms, provided always at least one of them is a phenyl or alkyl group, in an amount larger than 10% by weight of the amount of component (4) as platinum.

2. The composition as claimed in claim 1 wherein said diorganopolysiloxane is a methylvinylpolysiloxane having a viscosity exceeding 1,000 centistokes at 25° C.

3. The composition as claimed in claim 1 wherein said inorganic filler is a powdery silicious oxide.

4. The composition as claimed in claim 1 wherein said organohydrogenpolysiloxane is a methylhydrogenpolysiloxane.

5. The composition as claimed in claim 1 wherein said hydrazine compound is a monoalkylhydrazine.

6. The composition as claimed in claim 1 wherein said hydrazine compound is phenylhydrazine.

7. The composition as claimed in claim 1 wherein said hydrazine compound is β-methylphenylhydrazine.

8. The composition as claimed in claim 1 into which an organic peroxide is additionally incorporated in an amount of from 0.01 to 5 parts by weight based on 100 parts by weight of component (1).

9. A process for preparing the composition as claimed in claim 1 which comprises blending a mixture of components (1), (2) and (3) with the reaction product of components (4) and (5).

10. A heat-curable organopolysiloxane composition comprising (1) 100 parts by weight of a methylvinylpolysiloxane containing at least two vinyl groups per molecule and having a viscosity exceeding 1,000 centistokes at 25° C, (2) from 10 to 200 parts by weight of a powdery silicious oxide, (3) a methylhydrogenpolysiloxane containing at least two Si-H linkages per molecule in an amount sufficient for giving the Si-H linkages from 0.5 to 15 times in number compared to the vinyl groups contained in component (1), (4) platinum or a platinum-containing compound in a catalytic amount, and (5) methylhydrazine or phenylhydrazine in an amount larger than 10 % by weight of the amount of compound (4) as platinum.

11. The composition as claimed in claim 10 into which an organic peroxide is additionally incorporated in an amount of from 0.01 to 5 parts by weight based on 100 parts by weight of component (1).

* * * * *